(12) United States Patent
Chang et al.

(10) Patent No.: US 9,529,241 B2
(45) Date of Patent: Dec. 27, 2016

(54) MICROFLUIDIC DEVICE AND METHOD OF CONTROLLING FLUID IN THE SAME

(71) Applicant: SAMSUNG ELECTRONICS CO., LTD., Suwon-si (KR)

(72) Inventors: Jong-hyeon Chang, Suwon-si (KR); Woon-bae Kim, Seoul (KR); Seung-wan Lee, Suwon-si (KR); Eun-sung Lee, Hwaseong-si (KR); Kyu-dong Jung, Suwon-si (KR); Min-seog Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 722 days.

(21) Appl. No.: 13/855,288

(22) Filed: Apr. 2, 2013

(65) Prior Publication Data
US 2013/0306480 A1  Nov. 21, 2013

(30) Foreign Application Priority Data

May 16, 2012  (KR) .................... 10-2012-0052214

(51) Int. Cl.
*G02F 1/167* (2006.01)
*G02B 26/00* (2006.01)
*G02B 3/14* (2006.01)
*G02B 5/00* (2006.01)

(52) U.S. Cl.
CPC ............... *G02F 1/167* (2013.01); *G02B 3/14* (2013.01); *G02B 5/005* (2013.01); *G02B 26/005* (2013.01)

(58) Field of Classification Search
None
See application file for complete search history.

(56) References Cited

U.S. PATENT DOCUMENTS

| 7,242,528 | B2 | 7/2007 | Renders et al. |
| 7,791,814 | B2 | 9/2010 | Liogier D'ardhuy et al. |
| 2007/0179201 | A1* | 8/2007 | Maillard .................. G02B 3/14 516/9 |
| 2011/0255175 | A1* | 10/2011 | Okita ....................... G02B 3/14 359/665 |
| 2013/0016515 | A1* | 1/2013 | Chang .................. G02B 26/005 362/293 |

FOREIGN PATENT DOCUMENTS

| EP | 1798958 A1 * | 6/2007 | |
| EP | 1870741 A1 * | 12/2007 | ............... G02B 3/14 |
| JP | 2011-227194 A | 11/2011 | |
| KR | 10-0691372 B1 | 3/2007 | |
| KR | 10-0703089 B1 | 4/2007 | |

* cited by examiner

*Primary Examiner* — Matthew Martin
*Assistant Examiner* — Steven E Rosenwald
(74) *Attorney, Agent, or Firm* — Sughrue Mion, PLLC

(57) ABSTRACT

A microfluidic device and a method of controlling a fluid included in the microfluidic device. The microfluidic device includes: a chamber; a first fluid that is disposed in the chamber and in which a hygroscopic material is dissolved; a second fluid that is disposed in the chamber and is immiscible with the first fluid; and an electrode portion provide in the chamber and is configured to form an electrical field in the chamber when a voltage is applied to the electrode portion, wherein an interface between the first and second fluids is varied according to the electrical field.

16 Claims, 10 Drawing Sheets

MICROFLUIDIC DEVICE AND METHOD OF CONTROLLING FLUID IN THE SAME

CROSS-REFERENCE TO RELATED APPLICATION

This application claims priority from Korean Patent Application No. 10-2012-0052214, filed on May 16, 2012, in the Korean Intellectual Property Office, the disclosure of which is incorporated herein in its entirety by reference.

BACKGROUND

1. Field

Apparatuses and methods consistent with the present disclosure relate to microfluidic devices and methods of controlling a fluid in microfluidic devices.

2. Description of the Related Art

For microfluidic devices such as a liquid lens and a liquid aperture, liquid is an essential component. Thus, liquid dispensing is also an essential part of the manufacture of a microfluidic device. When sequentially dispensing a liquid into a plurality of microfluidic devices, there may be a difference in liquid volume due to evaporation of the liquid according to the environment and dispensing time. To solve this problem, a liquid having a low vapor pressure may be used in microfluidic devices. However, in this case, interfacial tension is reduced, viscous friction is increased, and packaging becomes complicated.

In addition, due to the recent development in microfluidics technology, a system that is capable of dispensing a liquid up to the level of picoliters (pL) has been developed in addition to various liquid-based devices. Most aqueous solutions including water evaporate in air and therefore decrease in volume and mass over time. Thus, the smaller an amount of aqueous solution, the faster the evaporation thereof. Accordingly, in order to obtain suitable volumes of a liquid dispensed in an array of pixels of a display device or other microfluidic devices, factors such as temperature, pressure, or humidity should be controlled to ensure conditions under which the liquid does not evaporate.

SUMMARY

One or more embodiments provide microfluidic devices including a fluid which may maintain a uniform volume.

One or more embodiments also provide methods of controlling a volume of a fluid applied to the microfluidic devices.

One or more embodiments also provide methods of controlling a fluid contained in the microfluidic devices.

According to an aspect of an embodiment, there is provided a microfluidic device includes: a chamber; a first fluid that is disposed in the chamber and in which a hygroscopic material is dissolved; a second fluid that is disposed in the chamber and is immiscible with the first fluid; and an electrode portion that is provided in the chamber and is configured to form an electrical field in the chamber when a voltage is applied to the electrode portion, wherein an interface between the first and second fluids is varied according to the electrical field.

A density of the first fluid may be an equilibrium density where absorption and evaporation of water is in equilibrium.

A volume variation of the first fluid may be 5% or less at an equilibrium density.

The hygroscopic material may include at least one of lithium chloride (LiCl) and lithium bromide (LiBr).

The second fluid may be a gas or a non-polar liquid.

A first interface between the first and second fluids may be a lens surface, and a second interface between the first and second fluids may induce a variation in curvature of the lens surface according to the electrical field.

The microfluidic device may further include an intermediate plate that is formed in the chamber and include a first through-hole forming a diameter of a lens corresponding to the lens surface and a second through-hole forming a path for the second fluid.

The microfluidic device may further include: an upper substrate and a lower substrate that are respectively formed on and under the intermediate plate; and a first and second spacer that are respectively disposed between the lower substrate and the intermediate plate, and between the intermediate plate and the upper substrate to form the space.

The microfluidic device may be an aperture controlling device in which a position of the interface between the first and second fluids varies according to the electrical field so as to control an aperture through which light is transmitted.

The chamber may include: a first channel; and a second channel that is formed above and connected to the first channel, wherein a range of the aperture is set according to a variation in a position of the interface between the first and second fluids occurring in each of the first and second channels.

A height of the second channel may be equal to or larger than a height of the first channel.

The chamber may include: a first substrate on which the electrode portion is formed; a second substrate that faces the first substrate and is spaced apart from the first substrate in a predetermined direction; and a third substrate that faces the second substrate and is spaced apart from the second substrate in the predetermined direction.

A through-hole may be formed in a center portion of the second substrate.

The first or second fluid may be a light-transmissive fluid that is disposed in a center portion of the chamber so as to flow through the through-hole, and the other fluid is a light-blocking or light-absorbing fluid that is disposed in a boundary portion of the chamber.

An opaque pattern portion may be disposed on a center portion of the third substrate to block light transmitted through the first and second channels.

The opaque pattern portion may have a size corresponding to a minimum size of the aperture that is set according to a flow of the first and second fluids.

According to an aspect of another embodiment, there is provided a method of controlling a fluid included in a microfluidic device. The method including: dispensing a first fluid into a chamber of the microfluidic device, wherein the first fluid is an aqueous solution in which a hygroscopic material is dissolved, into the chamber; and after a density of the first fluid has reached an equilibrium density at which absorption and evaporation speeds of water are in equilibrium, dispensing a second fluid that is immiscible with the first fluid, into the chamber.

The density of the first fluid reaches the equilibrium density when a volume of the first fluid is increased and the density of the first fluid is reduced.

The density of the first fluid reaches the equilibrium density when the volume of the first fluid is reduced and the density of the hygroscopic material of the first fluid is increased.

The hygroscopic aqueous solution may include at least one of lithium chloride (LiCl) and lithium bromide (LiBr).

BRIEF DESCRIPTION OF THE DRAWINGS

The above and/or other aspects will become apparent and more readily appreciated from the following description of embodiments, taken in conjunction with the accompanying drawings of which.

DETAILED DESCRIPTION

Figure 1:
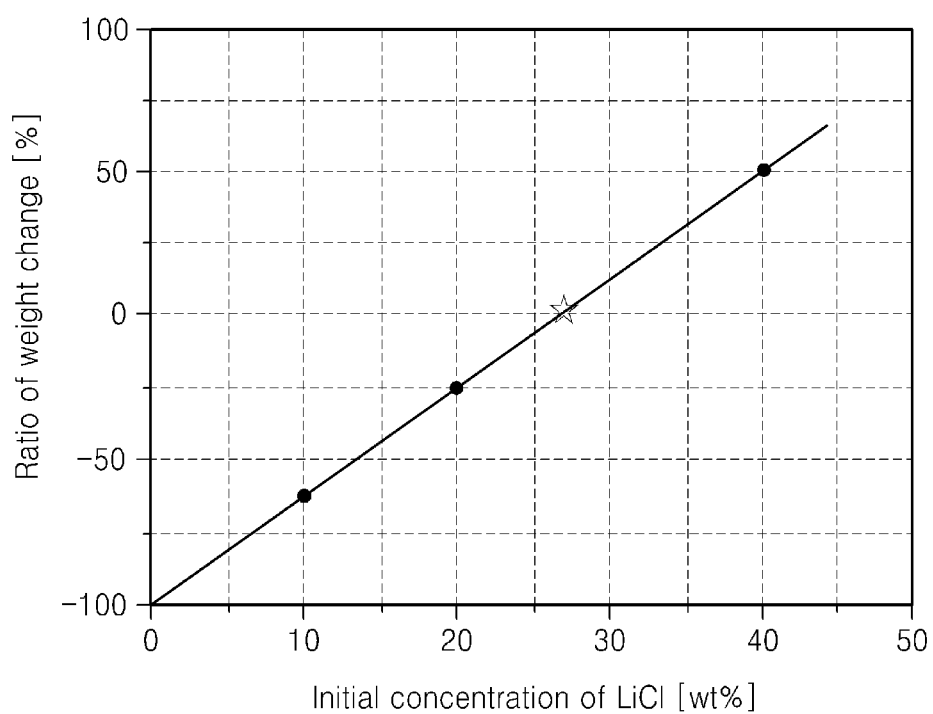
FIG. 1 is a graph showing variation in mass of aqueous solutions having different densities of lithium chloride after leaving the solutions exposed to air.

Various embodiments will now be described in detail with reference to the accompanying drawings, wherein like reference numerals refer to like elements throughout. In this regard, the embodiments may have different forms and should not be construed as being limited to the descriptions set forth herein. In the drawings, widths or thicknesses of layers or regions may be exaggerated for clarity of description. Expressions such as "at least one of," when preceding a list of elements, modify the entire list of elements and do not modify the individual elements of the list.

A microfluidic device according to an embodiment includes a chamber including an electrode portion. The electrode portion includes an electrode coated with an insulating material and a first fluid and a second fluid that are accommodated in the chamber, where each fluid has properties of being immiscible with each other. When a voltage is applied to the electrode portion, interfaces of the first and second fluids are varied due to the generated electrical field. As such, the microfluidic device may vary a refractive index of incident light or a transmittance amount of light according to the varied interfaces of the first and second fluids. When the microfluidic device varies the refractive index of light, the microfluidic device operates as a lens, and when the microfluidic device controls the transmission amount, the microfluidic device may operate as an aperture or a shutter.

In various embodiments, a polar fluid may be used as the first and/or second fluids applied to the microfluidic device. The polar fluid may be an aqueous solution in which a hygroscopic material is dissolved (hereinafter referred to as a "hygroscopic aqueous solution"). A hygroscopic material absorbs or evaporates water according to the weight ratio, humidity, or pressure, etc., of a hygroscopic material with respect to an aqueous solution. When absorption and evaporation of water are in equilibrium, the hygroscopic aqueous solution maintains an almost uniform volume. The density of the hygroscopic aqueous solution maintaining a uniform volume is referred to as equilibrium density. For example, at the equilibrium density, variation in volume of a hygroscopic aqueous solution may be 5% or less.

Examples of the hygroscopic material that may be used in a hygroscopic aqueous solution include, but are not limited to, lithium chloride (LiCl) or lithium bromide (LiBr). Other hygroscopic materials may also be used in the microfluidic device as long as they absorb water vapor and possess the ability to change phases into a liquid.

For example, when lithium chloride, which has intense hygroscopic properties, is left in the air, it absorbs water and becomes a liquid. FIG. 1 shows the variation in mass of aqueous solutions having different densities of lithium chloride after leaving the aqueous solutions exposed to air. Water of a low-density aqueous solution of 20 wt % or less is evaporated and thus mass and volume thereof are reduced, and an aqueous solution having a density of 40 wt % has absorbed water existing in the air and thus mass and volume thereof are increased. In addition, the mass variation of an aqueous solution according to an initial density of lithium chloride is linear. Accordingly, a lithium chloride aqueous solution reaches an equilibrium density of about 27 wt % according to evaporation or hygroscopy when exposed to air (denoted in FIG. 1 with a star). A lithium chloride aqueous solution of 27 wt % was tested in air, and as a result, variation of 1% or less was shown. The experiment was conducted at a normal temperature in an air atmosphere. The equilibrium density of the lithium chloride aqueous solution may vary according to temperature, humidity, or pressure.

In addition, when the hygroscopic aqueous solution is used as a fluid for blocking or absorbing light, a dye capable of blocking or absorbing light may be added thereto. Here, an equilibrium density of the hygroscopic aqueous solution may vary slightly according to the type and density of the added dye.

When the hygroscopic aqueous solution having an equilibrium density is used as a fluid of a microfluidic device, variation in volume of the fluid may be minimized, thereby maintaining performance of the microfluidic device.

In addition, when using the hygroscopic aqueous solution as a fluid, a fluid of a smaller volume than an allowed dispensing volume of a fluid dispensing system may be formed in a chamber of a microfluidic device. For example, a chamber volume of a microfluidic device is about 200 pL or less. However, the smallest dispensing volume of the fluid dispensing system is 200 pL. In this case, a hygroscopic aqueous solution of a low equilibrium density is dispensed in the chamber. Water of the hygroscopic aqueous solution is evaporated so that the volume thereof is decreased and the hygroscopic aqueous solution reaches an equilibrium density. Accordingly, even when a fluid having a larger volume than a desired volume is dispensed, the desired volume may be obtained.

Moreover, when a hygroscopic aqueous solution is used as a fluid, a volume of the hygroscopic aqueous solution may be controlled based on a density thereof, and thus a plurality of microfluidic devices may be easily manufactured.

Hereinafter, a microfluidic device, in which a hygroscopic aqueous solution may be used as a fluid, will be described.

Figure 2:
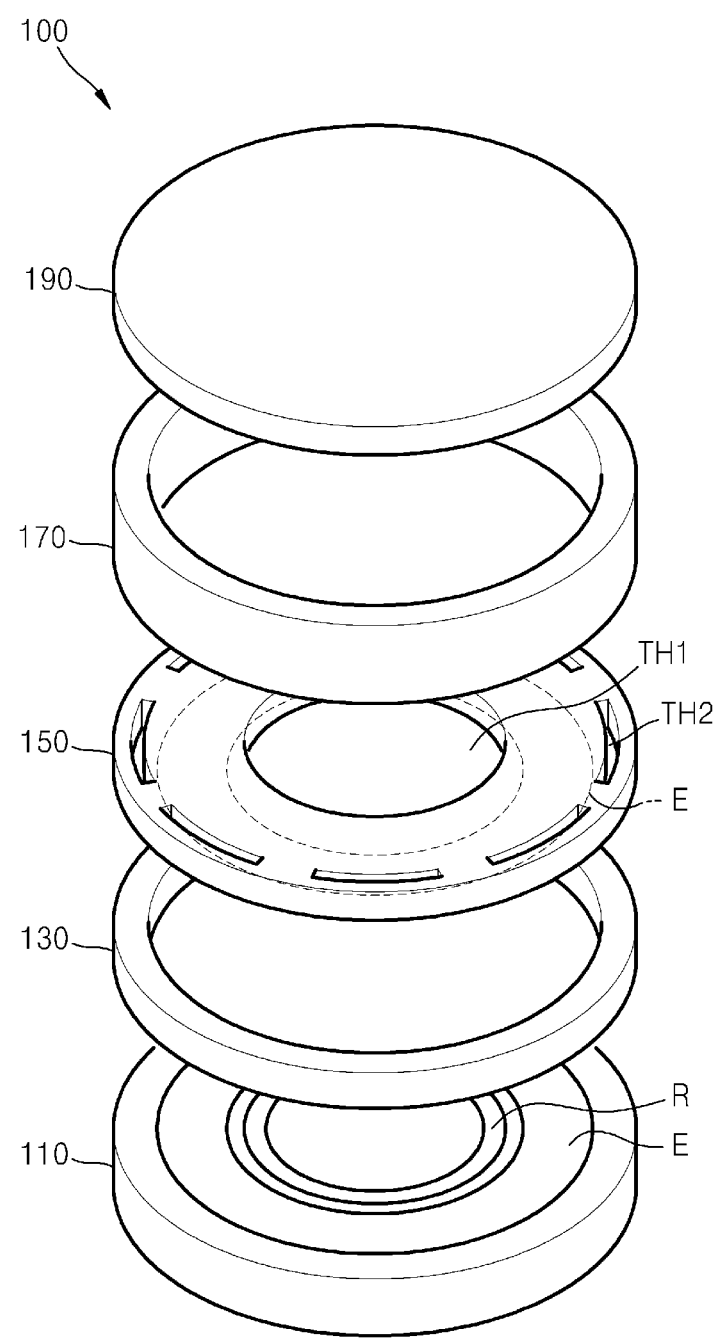
FIG. 2 is an exploded perspective view illustrating a schematic structure of a microfluidic device according to an embodiment.
Figure 3A:
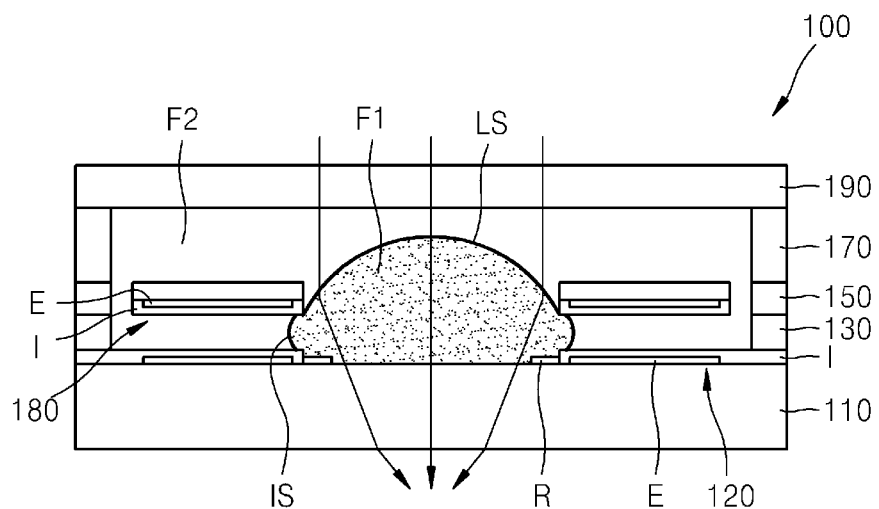
FIGS. 3A through 3C are cross-sectional views illustrating a schematic structure of the microfluidic device of FIG. 1.
Figure 3B:
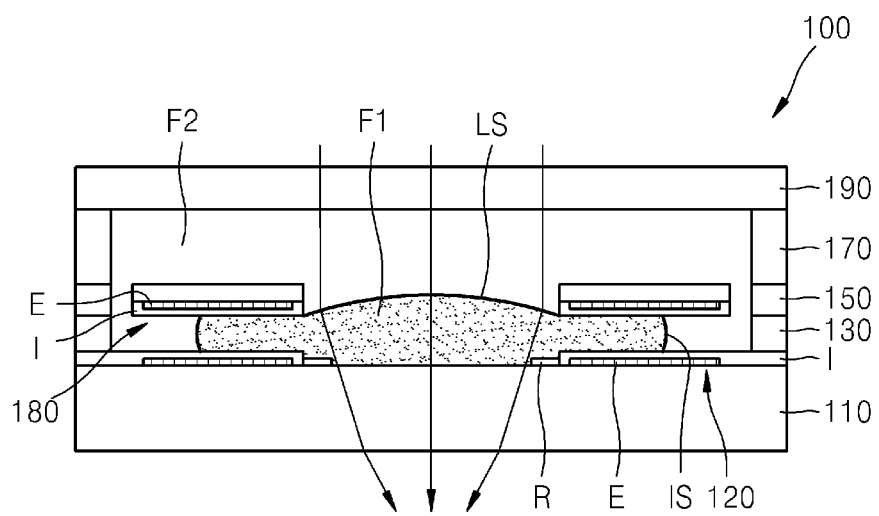
Figure 3C:
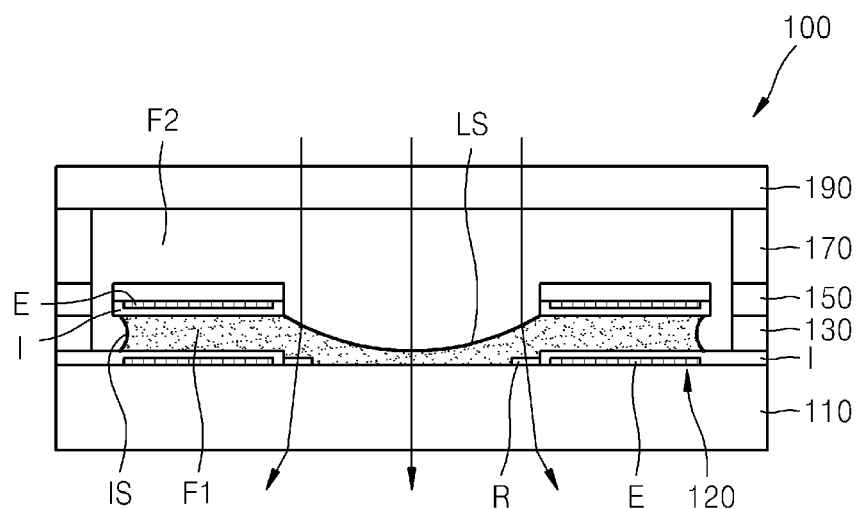

FIG. 2 is an exploded perspective view illustrating a schematic structure of a microfluidic device 100 according to an embodiment. FIGS. 3A through 3C are cross-sectional views illustrating a schematic structure of the microfluidic device of FIG. 2; here, lens surfaces having different curvatures according to amplitudes of applied voltages are illustrated. However, some elements are omitted in the perspective view of FIG. 2 for convenience. The microfluidic device 100 may function as a lens.

Referring to FIGS. 2 and 3A through 3C, a first fluid F1 which is light-transmissive and has a polarity, and a second fluid F2 that is not miscible with the first fluid F1 and is light-transmissive are provided in a chamber. The interface between the first fluid F1 and the second fluid F2 includes a first surface LS, which is a lens surface, and a second surface IS, which induces a variation in curvature in the lens surface LS. In addition, an electrode portion for forming an electrical field that changes a position of the second surface IS, is formed in the chamber. In order to form the first surface LS and the second surface IS, an intermediate plate 150 is formed in the chamber. Intermediate plate 150 includes a first through-hole TH1 constituting a diameter of a lens corresponding to the lens surface LS and a plurality of second through-holes TH2, each constituting a path for the second fluid F2. The number and the shape of the second through-holes TH2 is not limited as illustrated.

An upper substrate 190 and a lower substrate 110 may be formed on and under the intermediate plate 150, respectively; in order to form an inner space, spacer portions may be provided between the lower substrate 110 and the intermediate plate 150 and between the intermediate plate 150 and the upper substrate 190. The spacer portions include a first spacer 130 between the lower substrate 110 and the intermediate plate 150 and a second spacer 170 between the intermediate plate 150 and the upper substrate 190.

The structure and function of the microfluidic device 100 will be described in detail below.

The lower substrate 110, the intermediate plate 150, and the upper substrate 190 may be formed of a light-transmissive material.

The first fluid F1 and the second fluid F2 are formed of light-transmissive fluids having different refractive indices. The first fluid F1 may be a polar liquid, and the second fluid F2 may be a gas or a non-polar liquid. In particular, the first fluid F1 may be a hygroscopic aqueous solution. Examples of a hygroscopic material include, but are not limited to, lithium chloride (LiCl) and lithium bromide (LiBr). Other hygroscopic materials that are capable of absorbing water vapor and changing phases into a liquid may be applied to the microfluidic device 100. In addition, a density of the first fluid F1 may be an equilibrium density at which there is hardly any variation in volume of the first fluid F1.

In various embodiments, a hygroscopic aqueous solution having an equilibrium density may be dispensed in the chamber. In this case, immediately after dispensing the first fluid F1 in the chamber, the second fluid F2 may be dispensed in the chamber. In other embodiments, a hygroscopic aqueous solution having a smaller density than an equilibrium density may be dispensed in the chamber. In this case, the volume of the hygroscopic aqueous solution may be reduced, but the density thereof may increase so that after the hygroscopic aqueous solution has reached the equilibrium density, the second fluid F2 may be dispensed in the chamber. Alternatively, a hygroscopic aqueous solution having a greater density than the equilibrium density may be dispensed in the chamber. In this case, a volume of the hygroscopic aqueous solution increases but the density thereof is reduced, and thus when the hygroscopic aqueous solution reaches the equilibrium density, the second fluid F2 may be dispensed in the chamber. The first and second fluids F1 and F2 may be dispensed after the lower substrate 110, first and second electrode portions 120 and 180, the first and second spacers 130 and 170, and the intermediate plate 150 are coupled to form the chamber. Then, after the first and second fluids F1 and F2 are dispensed, the upper substrate 190 may be coupled to the second spacer 170.

The electrode portion includes, as illustrated in FIGS. 3A through 3C, the first electrode portion 120 that is formed on an upper surface of the lower substrate 110, and includes an electrode E coated with an insulating material I, and the second electrode portion 180 that is formed on a lower surface of the intermediate plate 150, and includes the electrode E coated with the insulating material I. However, in certain embodiments, just one of the first electrode portion 120 and the second electrode portion 180 may be included.

The microfluidic device 100 may further include a ground electrode R that is formed to contact the first fluid F1. The ground electrode R is disposed on the lower substrate 110 and may be ring-shaped. However, while no voltage is applied, the ground electrode R may be formed in any position where contact with the first fluid F1 is possible, and the shape thereof is also not limited as illustrated. The ground electrode R may be selectively included, and when the ground electrode R is included, a driving voltage may be reduced.

Electrodes of the first electrode portion 120 and the second electrode portion 180 may be formed of a transparent conductive material such as a metal oxide (e.g., indium tin oxide (ITO), indium zinc oxide (IZO)); nanoparticle dispersion thin films of metals (e.g., Au or Ag); carbon nanostructures (e.g., carbon nanotubes (CNT) or graphenes); or conductive polymer (e.g., poly(3,4-ethylenedioxythiophene) (PEDOT), polypyrrole (PPy), poly(3-hexylthiophene) (P3HT)). The ground electrode R may be formed of the above-described transparent conductive material, and if light-transmissivity of the ground electrode R is not required according to an arrangement position thereof, the ground electrode R may be formed of a thin film of a metal such as Au, Ag, Al, Cr, or Ti.

In the microfluidic device 100, a pressure on the second surface IS varies according to electrowetting-based driving, and the curvature of the first surface LS is controlled accordingly. Electrowetting refers to the phenomenon in which contact angles of liquid droplets are varied when a voltage is applied to the liquid droplets on an electrode coated with an insulator. That is, along a three-phase contact line where a fluid, liquid droplets, and the insulator meet, the contact angles of the liquid droplets vary according to interfacial tension of each of the fluid, the liquid droplets, and the insulator. When the electrowetting effect is used, a flow of a fluid may be controlled effectively and quickly using a low voltage, and transportation and control of the fluid may be performed reversibly.

Regarding the microfluidic device 100 according to the current embodiment, the first electrode portion 120 and the second electrode portion 180 are each formed of a single electrode E, and the position of the second surface IS is varied by controlling the amplitude of the voltage applied to the electrode E. That is, while a voltage is not applied as illustrated in FIG. 3A, according to the position of the second surface IS, the first surface LS has the greatest curvature. As illustrated in FIG. 3B, when a predetermined voltage is applied, the second surface IS expands in opposite directions, and curvature of the first surface LS is reduced. As illustrated in FIG. 3C, when the position of the second surface IS is moved as much as possible by applying a maximum voltage, the first surface LS has a concave curvature.

Figure 4A:
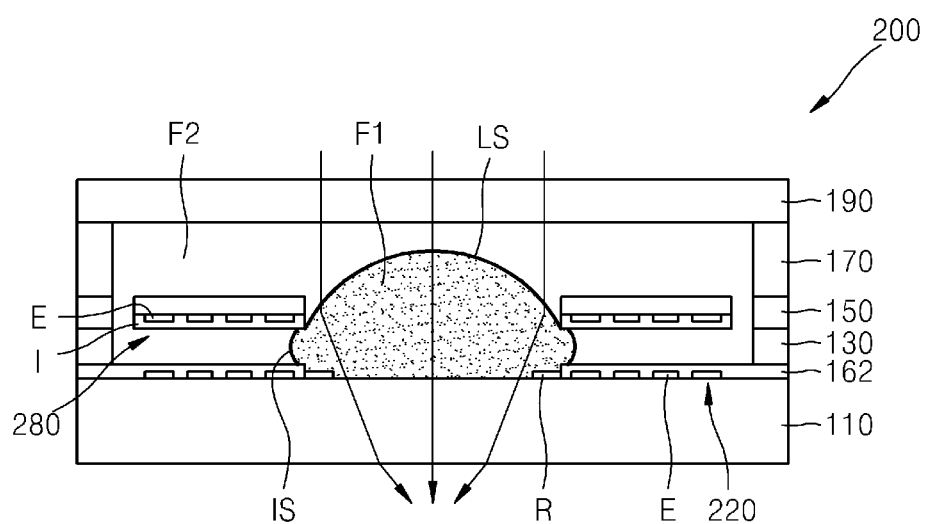
FIGS. 4A through 4C are cross-sectional views illustrating a schematic structure of a microfluidic device according to another embodiment.
Figure 4B:
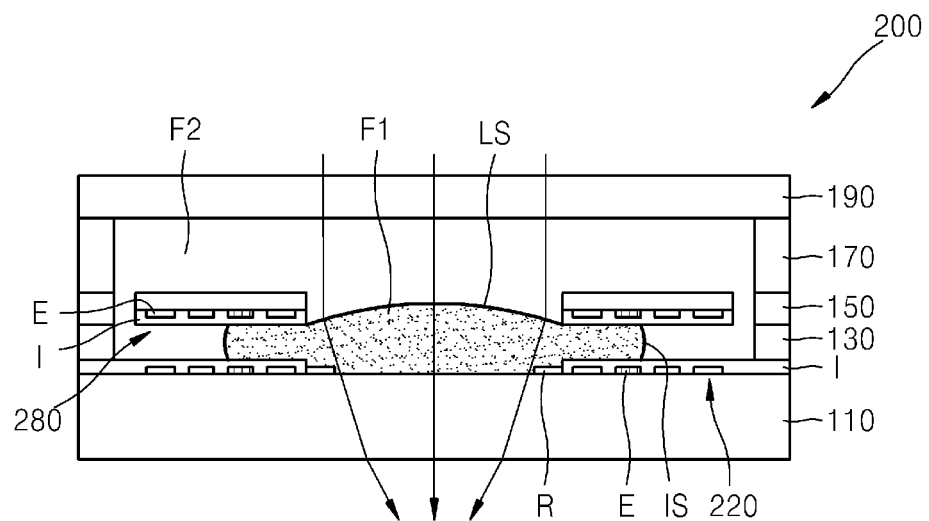
Figure 4C:
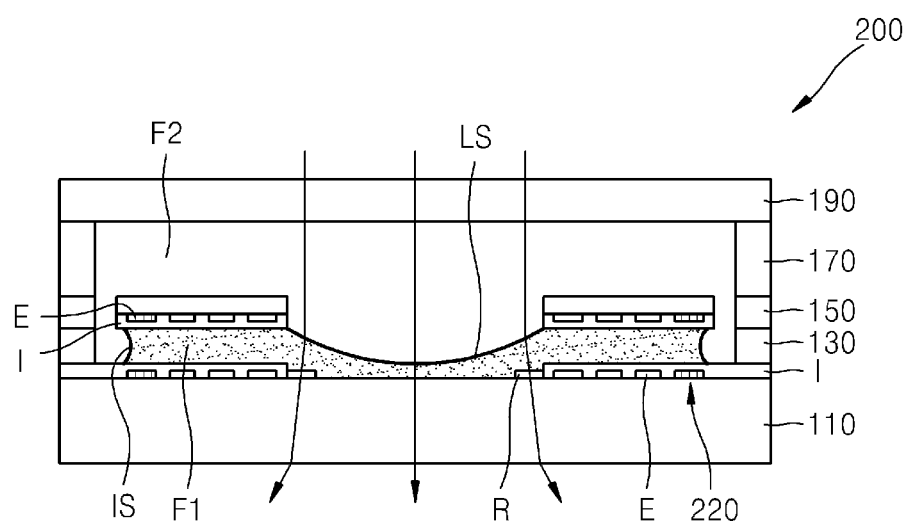

FIGS. 4A through 4C are cross-sectional views illustrating a schematic structure of a microfluidic device 200 according to another embodiment; here, lens surfaces having different curvatures are formed according to electrodes that are selected to apply a voltage thereto. The microfluidic device 200 illustrated in FIGS. 4A through 4C may therefore function as a lens.

The microfluidic device 200 is different from the microfluidic device 100 in that a first electrode portion 220 and a second electrode portion 280 are each formed of a plurality of electrodes E coated with an insulating material I. By applying a voltage to some of the electrodes E of the first electrode portion 220 and the second electrode portion 280, the curvature of the first surface LS may be digitally controlled.

When a voltage is not applied as illustrated in FIG. 4A, the lens surface LS has a maximum curvature. As illustrated in FIG. 4B, when a predetermined voltage is applied to one of the electrodes E, an electromechanical force is exerted on a three-phase contact line (TCL) of an activated driving electrode, that is, on a tangent line where the insulating material I and the second surface IS meet, so that the second surface IS is expanded in opposite directions, and the curvature of the first surface LS is reduced. As illustrated in FIG. 4C, when an appropriate voltage is applied to the electrode E disposed on an outermost portion, the second surface IS is expanded in opposite directions as much as possible, and the first surface LS has a concave curvature.

While the first electrode portion 220, the second electrode portion 280, and the ground electrode R are all shown in FIGS. 4A through 4C, in various embodiments, just one of the first electrode portion 220 and the second electrode portion 280 may be included, and the ground electrode R may be omitted. In addition, the plurality of electrodes E constituting the first electrode portion 220 and the second electrode portion 280 may be ring-shaped or square ring-shaped or the like.

Figure 5:
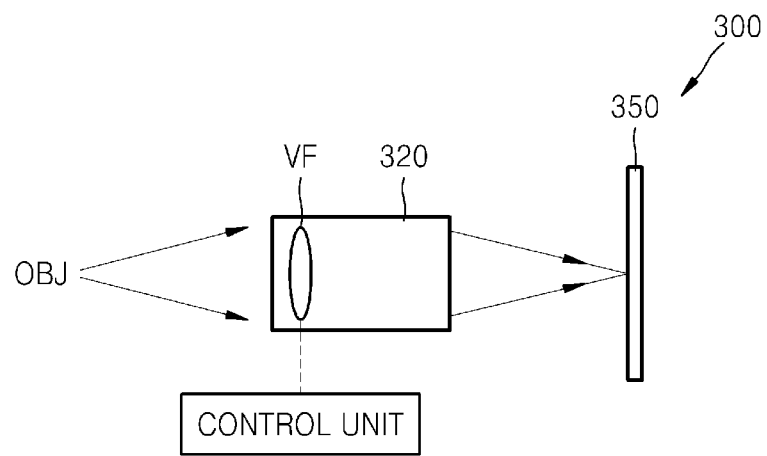
FIG. 5 illustrates a schematic structure of an imaging device according to an embodiment.

FIG. 5 illustrates a schematic structure of an imaging device 300 according to an embodiment.

Referring to FIG. 5, the imaging device 300 includes an imaging lens unit 320 including a variable focus lens VF, a control unit, and an image sensor 350.

One of the microfluidic devices 100 and 200 described above may be used as the variable focus lens VF, and the imaging lens unit 320 may further include at least one lens in addition to the variable focus lens VF according to necessity. The control unit controls a voltage for controlling curvature of a lens surface of the variable focus lens VF.

The image sensor 350 converts an optical image of an object OBJ formed using the imaging lens unit 320 into an electrical signal, and a charge coupled device (CCD) or a complementary metal-oxide semiconductor (CMOS) may be used as the image sensor 350.

As the curvature of the lens surface of the variable focus lens VF is controlled, a focal length of the imaging lens unit 320 is varied, and thus, auto-focusing or expansion or reduction of an object may be performed.

The microfluidic device 100 or 200 may also be used as an aperture controlling unit such as an aperture or a shutter.

The microfluidic device 100 or 200 includes a chamber including an electrode portion formed of an array of at least one electrode, and first and second fluids that are immiscible with each other may be included in the chamber, wherein one of the first and second fluids may be formed of a light-transmissive material, and the other may be formed of a light-blocking or light-absorbing material. In addition, a voltage may be selectively applied to some of the at least one electrode so that an interface between the first and second fluids is moved and an aperture through which light passes is controlled.

Figure 6:
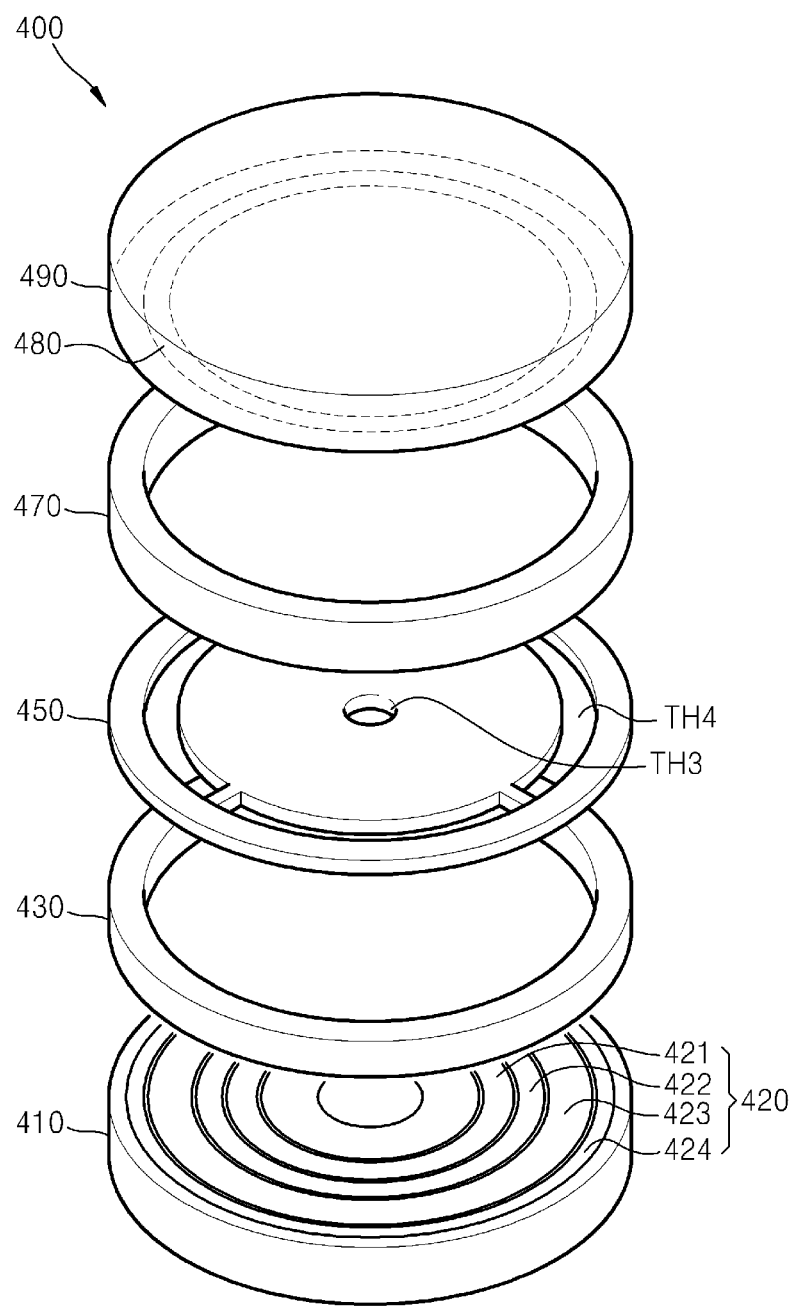
FIG. 6 is an exploded perspective view illustrating a schematic structure of a microfluidic device operating as an aperture controlling device, according to an embodiment.
Figure 7:
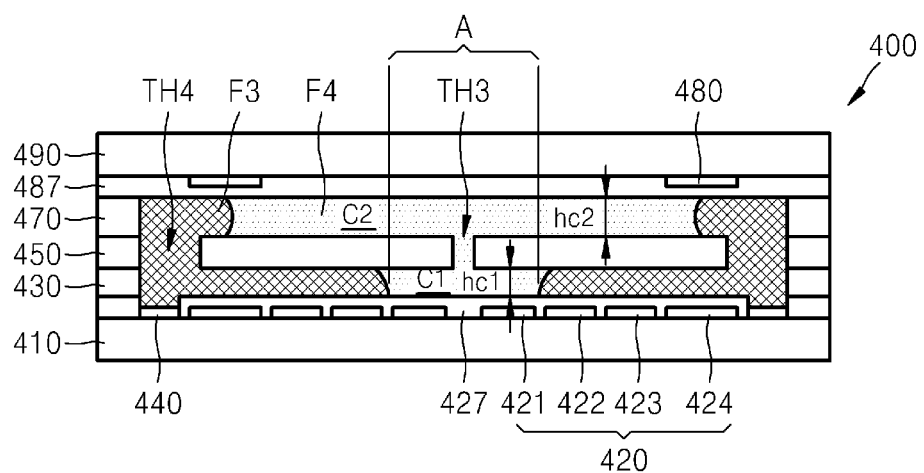
FIG. 7 is a cross-sectional view illustrating a schematic structure of a microfluidic device of FIG. 6 according to an embodiment.

FIG. 6 is an exploded perspective view illustrating a schematic structure of a microfluidic device 400 operating as an aperture controlling device, according to an embodiment. FIG. 7 is a cross-sectional view illustrating a schematic structure of the microfluidic device 400 of FIG. 6. However, some components of the microfluidic device 400 are omitted in FIG. 6 for convenience.

Referring to FIGS. 6 and 7, the microfluidic device 400 includes a first channel C1, and a second channel C2 that is formed above and connected in line to the first channel C1. Provided in the first channel C1 and the second channel C2 are a first fluid F3 and a second fluid F4 that are able to flow through the first channel C1 and the second channel C2.

The first fluid F3 and the second fluid F4 are not miscible with each other. In addition, one of the first fluid F3 and the second fluid F4 may be light-transmissive, and the other may be light-blocking or light-absorbing. One of the first and second fluids F3 and F4 is a polar liquid, and the other may be a gas or a non-polar liquid. In particular, the polar liquid may be a hygroscopic aqueous solution. Examples of a hydroscopic material include, but are not limited to, lithium chloride (LiCl) and lithium bromide (LiBr). Also, a hygroscopic material that absorbs water vapor and can change phases into a liquid may be applied to a microfluidic device. Also, the density of the hygroscopic aqueous solution may be an equilibrium density where the volume of the hygroscopic material hardly changes. In various embodiments, when a hygroscopic aqueous solution is used as a fluid for blocking or absorbing light, a dye that blocks or absorbs light may be added to the hygroscopic aqueous solution. The equilibrium density of the hygroscopic aqueous solution may be additionally varied according to the type or density of the dye.

Thus, a hygroscopic aqueous solution of an equilibrium density may be dispensed in a chamber. In this case, immediately after dispensing the hygroscopic aqueous solution in the chamber, the rest of the first and second fluids F3 and F4 may be dispensed in the chamber. In other embodiments, a hygroscopic aqueous solution having a smaller density than the equilibrium density may be dispensed in the chamber. In this case, a volume of the hygroscopic aqueous solution is reduced but the density thereof is increased so that the hygroscopic aqueous solution reaches the equilibrium density, and the rest of the first and second fluids F3 and F4 may be dispensed in the chamber. Dispensing of the first and second fluids F3 and F4 may be performed after the first and second channels C1 and C2 are formed.

In addition, an electrode portion to which a voltage is applied to form an electrical field that controls interfacial tension of an interface between the first fluid F3 and the second fluid F4 may be included. Thus, transmissitivity of incident light may be controlled as the size of an aperture A is varied according to a flow of the first fluid F3 and the second fluid F4.

The configuration and function of the microfluidic device 400 will now be described in more detail.

The first channel C1 and the second channel C2 form a single fluid chamber, and a path connecting the first and second channels C1 and C2 is formed at each of a boundary portion and a center portion of the chamber. A height hc2 of the second channel C2 may be equal to or greater than a height hc1 of the first channel C1. When the height hc2 of the second channel C2 is greater than the height hc1 of the first channel C1, an aperture ratio with respect to a channel width may be increased, and when the height hc2 of the second channel C2 is equal to the height hc1 of the first channel C1, a driving speed of the microfluidic device 400 may be further increased.

In detail, the first channel C1 is formed by a first substrate 410, a second substrate 450 that is spaced apart from the first substrate 410 by a first spacer 430. The second substrate 450 includes a first through-hole TH3 formed in a center portion thereof and one or more second through-holes TH4 formed in a peripheral portion thereof. The first spacer 430 is provided to form an inner space between the first substrate 410 and the second substrate 450. The second channel C2 is formed by the second substrate 450, a third substrate 490 that is spaced apart from the second substrate 450, and a second spacer 470 that is provided to form an inner space between the second substrate 450 and the third substrate 490. A cross-section (i.e., diameter) of the first through-hole TH3 is smaller than that of the second through-hole TH4, as shown in FIGS. 6 and 7, but embodiment are not limited thereto.

The first substrate 410, the second substrate 450, and the third substrate 490 may be formed of a light-transmissive material.

The first fluid F3 is a fluid having a property of blocking or absorbing light, and is disposed in a boundary portion of the chamber. The first fluid F3 may be a polar liquid such as an aqueous solution in which a hygroscopic material is dissolved.

The second fluid F4 is a light-transmissive fluid that is not miscible with the first fluid F3 and is disposed in a center of the chamber. For example, a gas or a non-polar liquid may be used as the second fluid F4.

The first fluid F3 and the second fluid F4 form a fluid interface in the first channel C1 and the second channel C2, respectively, and a size of the aperture A is controlled by movement of the fluid interface, which will be described in detail later.

The electrode portion includes a first electrode portion 420 formed of at least one electrode formed on the first substrate 410 and a second electrode portion 480 formed of at least one electrode formed on the third substrate 490. The first electrode portion 420 and the second electrode portion 480 are coated with an insulating material; for example, a first dielectric layer 427 covering the first electrode portion 420 and a second dielectric layer 487 covering the second electrode portion 480 are formed.

The first electrode portion 420 may include at least one electrode to digitally control the aperture A. For example, as illustrated in FIGS. 6 and 7, the first electrode portion 420 may include a plurality of electrodes 421, 422, 423, and 424 that are concentric annuluses and have different radii. The second electrode portion 480 may also include at least one electrode. For example, as illustrated in FIGS. 6 and 7, the second electrode portion 480 may include a ring-shaped electrode. However, the shape or number of electrodes of the first electrode portion 420 and the second electrode portion 480 are not limited as illustrated and may be modified in various ways.

A ground electrode portion 440 may be formed to maintain contact with a polar fluid at at least one position in the chamber; for example, the ground electrode portion 440 may be formed to be in contact with the first fluid F3 which is polar, and may be disposed on the first substrate 410 as illustrated in FIG. 7.

The first and second electrode portions 420 and 480 may be formed of electrodes formed of a transparent conductive material such as a metal oxide (e.g., indium tin oxide (ITO) or indium zinc oxide (IZO)); nanoparticle dispersion thin films of metals (e.g., Au or Ag); carbon nanostructures (e.g., carbon nanotubes (CNT) or graphenes); or a conductive polymer (e.g., poly(3,4-ethylenedioxythiophene) (PEDOT), polypyrrole(PPy), or poly(3-hexylthiophene)(P3HT)).

According to an arrangement position thereof, the ground electrode portion 440 does not require light transmissivity, and may therefore be formed of a thin film of a metal such as Au, Ag, Al, Cr, or Ti.

In the microfluidic device 400, the interface between the first fluid F3 and the second fluid F4 is controlled to move toward a center or in an opposite direction thereto according to electrowetting driving, a height difference between the first and second channels C1 and C2, and a difference in diameters of the first through-hole TH3 and the second through-hole TH4. As such, the size of the aperture A is varied accordingly.

Figure 8A:
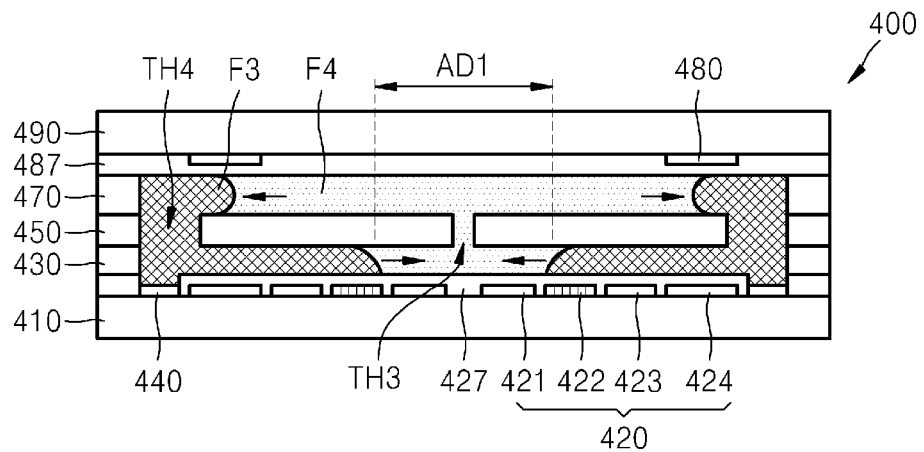
FIGS. 8A and 8B illustrate operation of the microfluidic device of FIG. 7 for controlling light transmittance, in which different sizes of aperture diameters are formed.
Figure 8B:
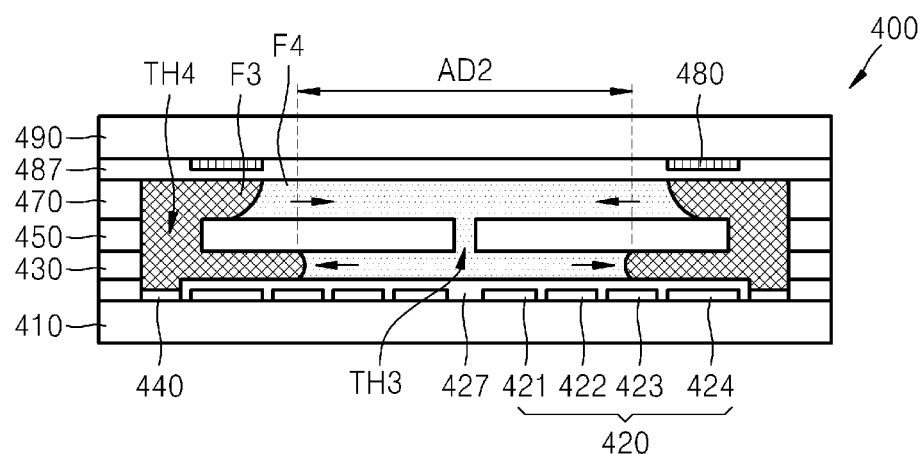

FIGS. 8A and 8B illustrate operation of the microfluidic device 400 of FIG. 7 for controlling light transmittance, in which different sizes of aperture diameters AD1 and AD2 are formed.

When an appropriate voltage is applied to one of the electrodes of the first electrode portion 420, an electromechanical force is exerted on a TCL of an activated driving electrode, for example, electrode 422. That is, an electromechanical force is exerted on a tangent line where the first fluid F3, the second fluid F4, and the first dielectric layer 427 meet, so that the first fluid F3 moves toward a center through the first channel C1 to reduce the aperture A, thereby forming an aperture diameter AD1 as illustrated in FIG. 8A.

When an appropriate voltage is applied to the second electrode portion 480, the first fluid F3 moves toward the center through the second channel C2, and the TCL of the first channel C1 is pushed toward a boundary portion, thereby expanding the aperture A and forming an aperture diameter AD2 as illustrated in FIG. 8B.

Thus, when the first electrode portion 420 is formed of the plurality of electrodes 421, 422, 423, and 424, which are concentric annuluses, the size of the aperture A may be digitally controlled by varying the activated electrode.

As described in the embodiments above, the first fluid F3 which is light-blocking or light-absorbing is polar, and the second fluid F4 which is light-transmissive is non-polar. However, in various embodiments, the first fluid F3 may be non-polar and the second fluid F4 may be polar. In such a case, when a voltage is applied to the first electrode portion 420, the aperture A is widened, and when a voltage is applied to the second electrode portion 480, the aperture A is narrowed.

Figure 9:
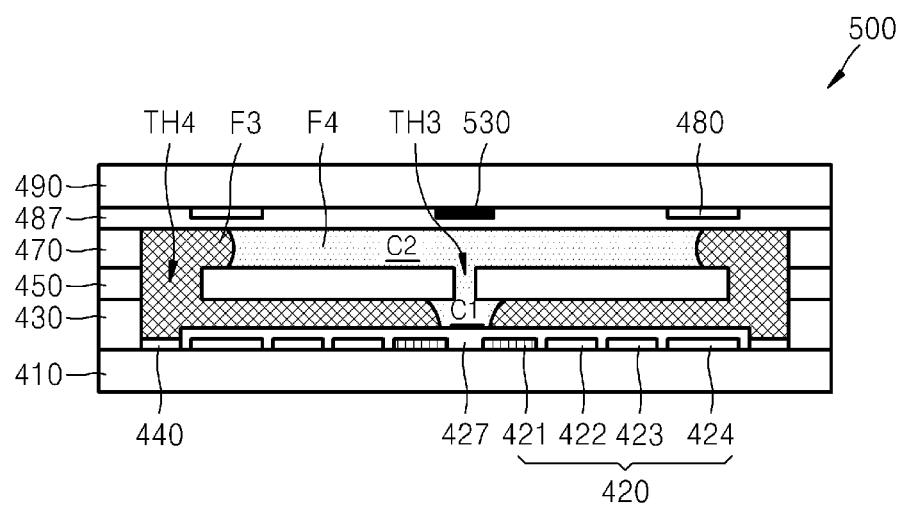
FIG. 9 is a cross-sectional view illustrating a schematic structure of a microfluidic device according to another embodiment.

FIG. 9 is a cross-sectional view illustrating a schematic structure of a microfluidic device 500 according to another embodiment.

The microfluidic device 500 is different from the microfluidic device 400 of FIGS. 5, 6, 7, 8A, and 8B in that the microfluidic device 500 may function as a shutter whose aperture may be completely shielded. In this embodiment, an opaque pattern portion 530 capable of blocking light transmitted through the first and second channels C1 and C2 may be formed on a center portion of the third substrate 490. The opaque pattern portion 530 may have a size corresponding to a minimum size of an aperture that is set by a flow of the first fluid F3 and the second fluid F4. That is, as the electrode 421 disposed in a centermost portion of the first electrode 420 is activated, the TCL of the first channel C1 is moved to the center portion as much as possible, and light transmitted through the smallest aperture is blocked by the opaque pattern portion 530.

The microfluidic devices 400 and 500 described above use electrowetting-based driving, and thus a controlling speed thereof is fast and power consumption thereof is low. As such, the microfluidic devices 400 and 500 may be used as a variable aperture or a pixel shutter in an image obtaining device or an image display device.

Figure 10:
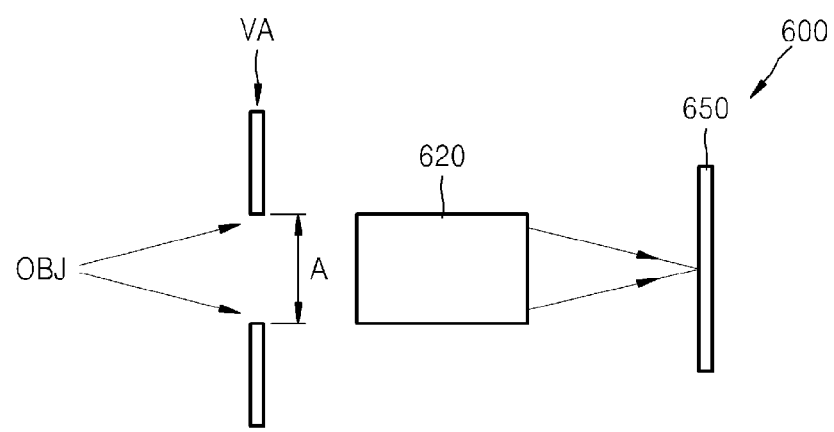
FIG. 10 illustrates a schematic structure of an image obtaining device according to an embodiment.

FIG. 10 illustrates a schematic structure of an image obtaining device 600 according to an embodiment.

The image obtaining device 600 includes: a variable aperture VA, wherein a size of an aperture A of the variable aperture VA, through which light is incident from an object OBJ, is controlled; an imaging unit 620 forming an image of the object OBJ based on light that is incident through the variable aperture A; and an imaging device 650 converting the image formed by using the imaging unit 620 into an electrical signal.

As the variable aperture VA, the above-described microfluidic device 400 may be used, and the imaging unit 620 may include at least one lens. The lens may be the microfluidic device 100 or 200 described above. As the imaging device 650, a CCD or a CMOS may be used.

As the variable aperture VA uses a microelectrofluidic method and allows fine adjustments at a high speed, the imaging obtaining device 600 i may be suitably used as a medical imaging device such as an optical coherence tomography (OCT) device or a microscope.

Figure 11:
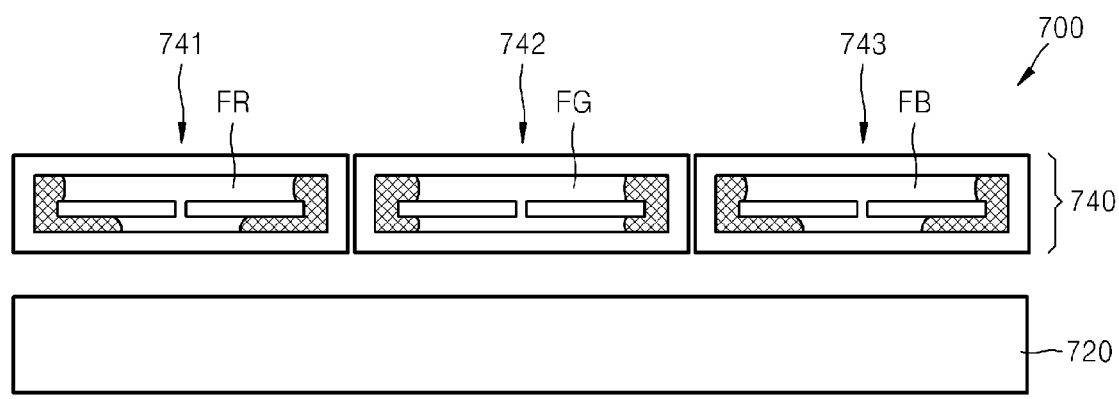
FIG. 11 illustrates a schematic structure of an image display device according to an embodiment.

FIG. 11 illustrates a schematic structure of an image display device 700 according to an embodiment.

The image display device 700 includes a light source unit 720 providing light for forming an image and a display panel 740 controlling transmittance of light provided by the light source 720 according to image information.

The display panel 740 may include an array of a plurality of microfluidic devices 400. For example, the display panel 740 may include a first device 741, a second device 742, and a third device 743. The first device 741 may be one of the aperture controlling devices described above and include a light-transmissive fluid FR representing a first color. The second device 742 may be one of the aperture controlling devices described above and include a light-transmissive fluid FG representing a second color. The third device 743 may be one of the aperture controlling devices described above and include a light-transmissive fluid FB representing a third color. The first, second, and third colors may be red, green, and blue, respectively. Driving of an electrode portion of each of the first, second, and third devices 741, 742, and 743 may be controlled according to image information so as to transmit or block light that is incident from the light source 720. Also, as the aperture sizes may be controlled in a transmission mode, gradation may be expressed.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A microfluidic device comprising: a chamber;
   a first fluid that is disposed in the chamber and in which a hygroscopic material is dissolved;
   a second fluid that is disposed in the chamber and is immiscible with the first fluid; and an electrode portion that is provided in the chamber and is configured to form an electrical field in the chamber when a voltage is applied to the electrode portion,
   wherein an interface between the first and second fluids is varied according to the electrical field, and
   wherein the first fluid consists essentially of the hygroscopic material and water and the hygroscopic material is in a concentration such that there is substantially no weight change in the solution when exposed to air compared to when the hygroscopic material was initially added to the solution.

2. The microfluidic device of claim 1, wherein a volume variation of the first fluid is 5% or less in reference to a reference volume of the first fluid measured at an-the equilibrium density.

3. The micro fluidic device of claim 1, wherein the hygroscopic material comprises at least one of lithium chloride (LiCl) and lithium bromide (LiBr).

4. The micro fluidic device of claim 1, wherein the second fluid is a gas or a non-polar liquid.

5. The micro fluidic device of claim 1, wherein a first interface between the first and second fluids is a lens surface, and a second interface between the first and second fluids induces a variation in curvature of the lens surface according to the electrical field.

6. The micro fluidic device of claim 5, further comprising an intermediate plate that is provided in the chamber and comprises a first through-hole forming a diameter of a lens corresponding to the lens surface and a second through-hole forming a path for the second fluid.

7. The micro fluidic device of claim 6, further comprising:
   an upper substrate that is disposed over the intermediate plate;
   a lower substrate that is disposed under the intermediate plate;
   a first spacer that is disposed between the lower substrate and the intermediate plate; and
   a second spacer that is disposed between the intermediate plate and the upper substrate.

8. The micro fluidic device of claim 1, wherein the microfluidic device is an aperture controlling device which is configured to vary a position of the interface between the first and second fluids according to the electrical field so as to control an aperture through which light is transmitted.

9. The microfluidic device of claim 8, wherein the chamber comprises: a first channel; and
   a second channel that is formed above and connected to the first channel, wherein a range of the aperture is set according to a variation in a position of the interface between the first and second fluids occurring in each of the first and second channels.

10. The micro fluidic device of claim 9, wherein a height of the second channel is equal to or larger than a height of the first channel.

11. The microfluidic device of claim 8, wherein the chamber comprises: a first substrate on which the electrode portion is formed;
   a second substrate that faces the first substrate and is spaced apart from the first substrate in a predetermined direction; and a third substrate that faces the second substrate and is spaced apart from the second substrate in the predetermined direction.

12. The micro fluidic device of claim 11, wherein a through-hole is formed in a center portion of the second substrate.

13. The microfluidic device of claim 12, wherein one of the first fluid and the second fluid is a light-transmissive fluid that is disposed in a center portion of the chamber so as to flow through the through-hole, and the other of the first fluid and the second fluid is a light-blocking or light-absorbing fluid that is disposed in a boundary portion of the chamber.

14. The micro fluidic device of claim 11, further comprising an opaque pattern portion disposed on a center portion of the third substrate to block light transmitted through the first and second channels.

15. The micro fluidic device of claim 14, wherein the opaque pattern portion has a size corresponding to a minimum size of the aperture.

16. The microfluidic device of claim 3, wherein the equilibrium density of the LiCl included in the first fluid is approximately 27 wt %, as measured in an air atmosphere.

* * * * *